US009587152B2

United States Patent
Kelch et al.

(10) Patent No.: US 9,587,152 B2
(45) Date of Patent: *Mar. 7, 2017

(54) TWO-COMPONENT POLYURETHANE COMPOSITIONS, IN PARTICULAR SUITABLE FOR USE AS TOUGH STRUCTURAL ADHESIVES OR AS POTTING COMPOUNDS

(71) Applicant: SIKA TECHNOLOGY AG, Baar (CH)

(72) Inventors: Steffen Kelch, Oberenstringen (CH); Wolfgang Dürnay, Bad Urach (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/428,548

(22) PCT Filed: Sep. 5, 2013

(86) PCT No.: PCT/EP2013/068384
§ 371 (c)(1),
(2) Date: Mar. 16, 2015

(87) PCT Pub. No.: WO2014/040909
PCT Pub. Date: Mar. 20, 2014

(65) Prior Publication Data
US 2015/0232722 A1     Aug. 20, 2015

(30) Foreign Application Priority Data
Sep. 14, 2012   (EP) .................................. 12184557

(51) Int. Cl.
*C08G 18/38*    (2006.01)
*C09J 175/06*   (2006.01)
(Continued)

(52) U.S. Cl.
CPC ............... *C09J 175/06* (2013.01); *B32B 7/12* (2013.01); *B32B 37/1284* (2013.01);
(Continued)

(58) Field of Classification Search
CPC ............ C08G 18/7621; C08G 18/7671; C08G 18/3206; C08G 18/36; C09J 175/06;
(Continued)

(56) References Cited

U.S. PATENT DOCUMENTS 4,609,572 A * 9/1986 Gruber ............... C08G 18/0885
427/140
5,021,535 A * 6/1991 Vu ...................... C08G 18/0885
252/182.22
(Continued)

FOREIGN PATENT DOCUMENTS

CN     101151290 A     3/2008
DE     102008026266 A1  12/2009
(Continued)

OTHER PUBLICATIONS

Dec. 20, 2013 International Search Report issued in International Patent Application No. PCT/EP2013/068384.
(Continued)

*Primary Examiner* — Michael L Leonard
(74) *Attorney, Agent, or Firm* — Oliff PLC

(57) ABSTRACT

The invention concerns two-component polyurethane compositions of a polyol component and a polyisocyanate component, the polyol component including at least one reaction product of castor oil and ketone resins with an OH number of 110 to 200 mg KOH/g, and at least one aliphatic triol, and the polyisocyanate component including at least one aromatic polyisocyanate, the ratio in weight percent of being between 4 and 50 and the ratio of all NCO groups of the aromatic polyisocyanates to all the OH groups totaling
(Continued)

Figure 1:
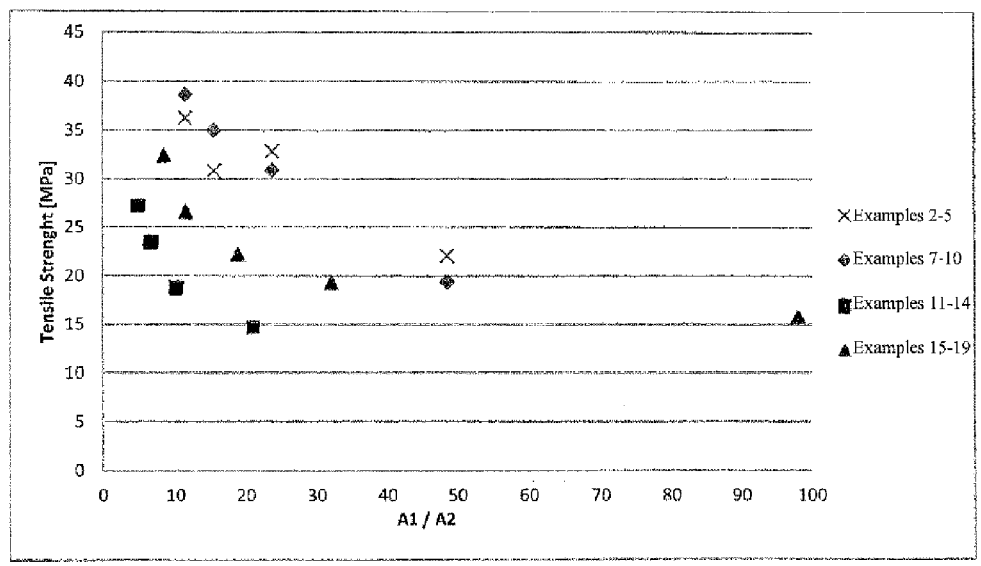

(A1+A2)=1.15:1-85:1, the aliphatic triol being-1,2,3-propane triol and/or-1,1,1-trimethylol propane and/or polyether polyols based on 1,1,1-trimethylol propane with a molecular weight of 170-500 g/mol and an OH-number of 400-1100 mg KOH/g, and the total of all the OH groups of (A1+A2) being ≥90% of the total of all the OH groups of the two-component polyurethane composition.

18 Claims, 4 Drawing Sheets

(51) Int. Cl.
    *C08G 18/76* (2006.01)
    *C08G 18/68* (2006.01)
    *C08G 18/32* (2006.01)
    *B32B 37/12* (2006.01)
    *C09J 5/00* (2006.01)
    *B32B 7/12* (2006.01)
    *C09J 175/04* (2006.01)
    *C08G 18/36* (2006.01)

(52) U.S. Cl.
    CPC ......... *C08G 18/3206* (2013.01); *C08G 18/36* (2013.01); *C08G 18/686* (2013.01); *C08G 18/7621* (2013.01); *C08G 18/7671* (2013.01); *C09J 5/00* (2013.01); *C09J 175/04* (2013.01); *B32B 37/12* (2013.01); *B32B 2037/1253* (2013.01); *B32B 2457/00* (2013.01); *C08G 2190/00* (2013.01); *Y10T 428/20* (2015.01); *Y10T 428/31551* (2015.04)

(58) Field of Classification Search
CPC .......... C09J 175/04; B32B 7/12; B32B 37/12; B32B 2037/1253
See application file for complete search history.

(56) References Cited

U.S. PATENT DOCUMENTS

| | | | |
|---|---|---|---|
| 2002/0157789 A1 | 10/2002 | Imai et al. | |
| 2004/0138402 A1 | 7/2004 | Thiele et al. | |
| 2009/0081368 A1* | 3/2009 | Roser | C04B 41/4884 427/299 |
| 2009/0095820 A1* | 4/2009 | Roser | E01B 1/001 238/2 |
| 2010/0028542 A1* | 2/2010 | Reese | C08L 75/04 427/372.2 |
| 2010/0178110 A1* | 7/2010 | Schmidt | C08G 18/4891 405/30 |

FOREIGN PATENT DOCUMENTS

| | | | | |
|---|---|---|---|---|
| EP | 2469075 A1 | 6/2012 | | |
| GB | 1182884 | * | 3/1969 | ............ C08G 22/08 |
| WO | 02/066572 A1 | 8/2002 | | |

OTHER PUBLICATIONS

Aug. 29, 2016 Office Action issued in Chinese Patent Application No. 201380055082.3.

* cited by examiner

TWO-COMPONENT POLYURETHANE COMPOSITIONS, IN PARTICULAR SUITABLE FOR USE AS TOUGH STRUCTURAL ADHESIVES OR AS POTTING COMPOUNDS

TECHNICAL FIELD

The invention relates to the field of two-component polyurethane compositions, in particular of viscoplastic structural two-component polyurethane adhesives and/or potting compounds.

PRIOR ART

Two-component polyurethane adhesives based on polyols and polyisocyanates have already been used for a very long time. Two-component polyurethane adhesives have the advantage that they cure rapidly after mixing and are therefore able to rapidly absorb and transfer higher forces already after a short time. However, for use as structural adhesives, stringent requirements are placed on such adhesives in terms of strength and extensibility, since such adhesives represent elements of load-bearing structures.

In particular, there is a demand for adhesives that have high strengths in the sense of structural bonding and nevertheless a high extensibility.

DESCRIPTION OF THE INVENTION

The problem of the present invention therefore is to provide a two-component polyurethane composition, in particular a structural two-component polyurethane adhesive, which has high strength and at the same time high elongation. This is made possible by the two-component polyurethane composition according to Claim 1.

Surprisingly, the two-component polyurethane composition according to the invention achieves a high strength of the cured material, without thereby losing its elasticity.

Further aspects of the invention are the subject matter of additional independent claims. Particularly preferred embodiments of the invention are the subject matter of the dependent claims.

BRIEF DECSRIPTION OF THE DRAWINGS

Figure 2:
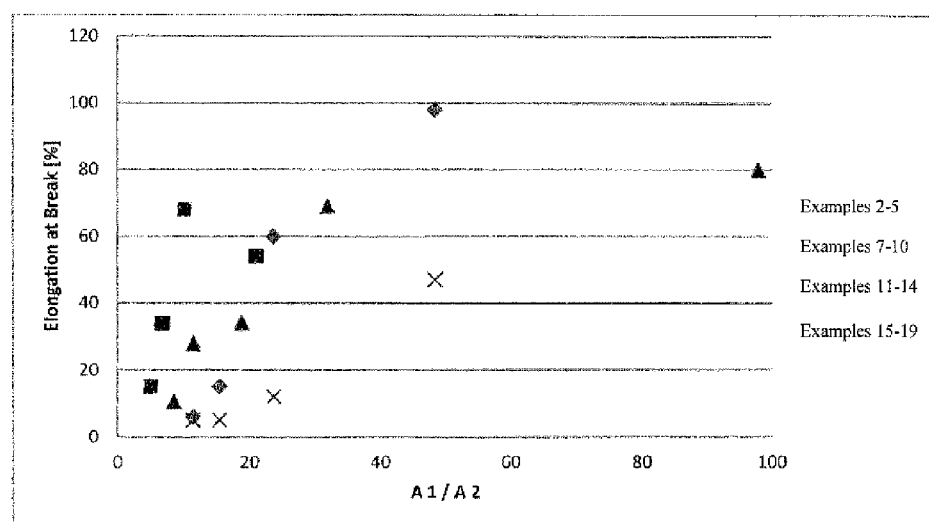
Figure 3:
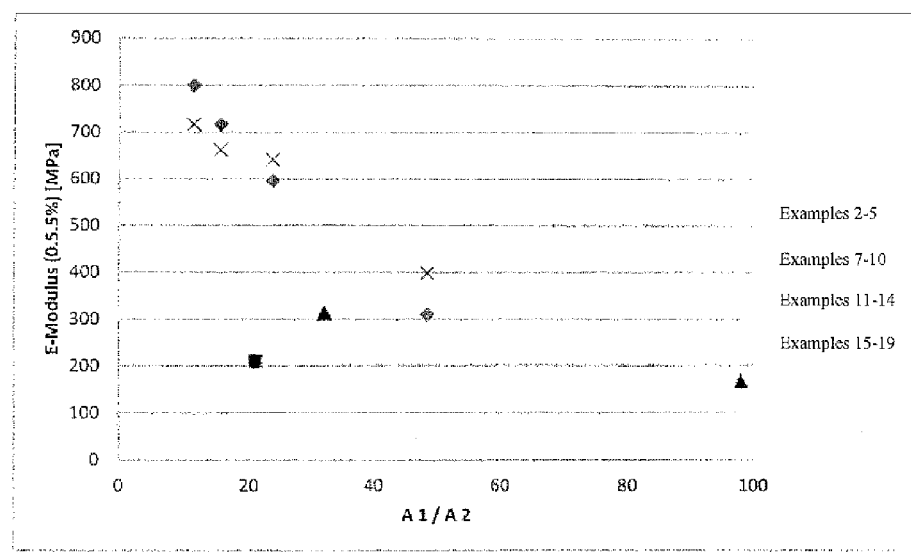
Figure 4:
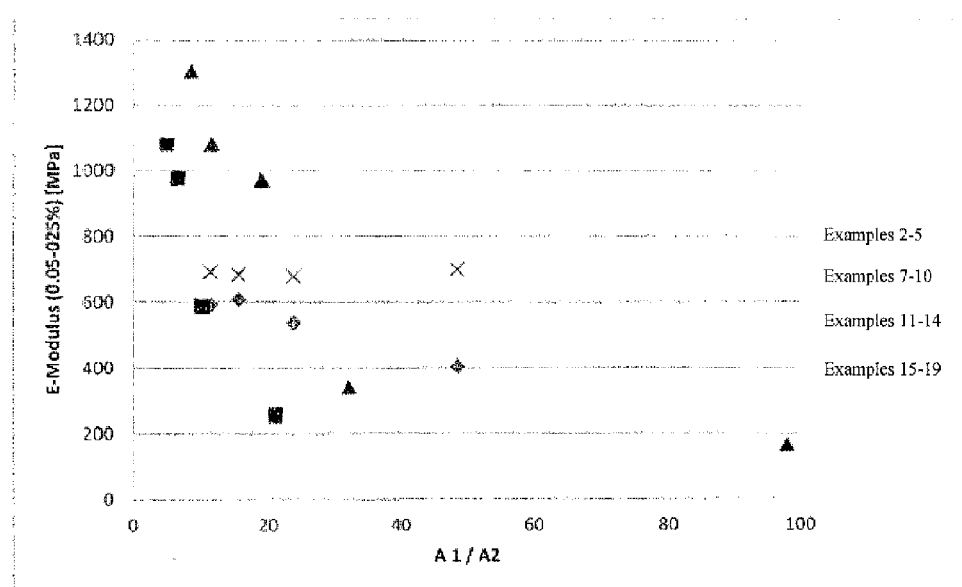

FIG. 1: Tensile Strength from Table 3
FIG. 2: Elongation at Break (%) results from Table 3
FIG. 3: E-Modulus (0.05-05%) [MPa] from Table 3
FIG. 4: E-Modulus (0.05-0.025%) [MPa] from Table 3

WAYS OF CARRYING OUT THE INVENTION

The present invention relates to a two-component polyurethane composition consisting of a polyol component K1 and of a polyisocyanate component K2;
wherein the polyol component K1
comprises at least one reaction product of *ricinus* oil with ketone resins with an OH number of 110 to 200 mg KOH/g A1, and
at least one aliphatic triol A2,
and wherein the polyisocyanate component K2
comprises at least one aromatic polyisocyanate B1,
wherein the weight percent ratio (A1/A2) is 4-50 and
wherein the ratio of all the NCO groups of the aromatic polyisocyanates B1 to all the OH groups in the sum of (A1+A2)=1.15:1-0.85:1,
wherein the aliphatic triol A2 is:
1,2,3-propanetriol and/or
1,1,1-trimethylolpropane and/or
polyether polyols based on 1,1,1-trimethylolpropane with a molecular weight of 170-500 g/mol and an OH number of 400-1100 mg KOH/g,
and wherein the total of all the OH groups of (A1+A2) is ≥90% of the total of all the OH groups of the two-component polyurethane composition.

The present polyol component K1 comprises at least one reaction product of *ricinus* oil with ketone resins with an OH number of 110 to 200 mg KOH/g A1.

An OH number of 155 to 190 mg KOH/g is preferable. Moreover, it preferably has an OH equivalent weight of 300 to 400 g/eq.

As such polyether and/or polyester polyols, it is preferable to use reaction products of *ricinus* oil with ketone resins, preferably reaction products of *ricinus* oil with cyclohexanone, for example, in particular those marketed by Bayer under the name of Desmophen® 1150 and by Cognis under the name of Sovermol® 805.

The term "*ricinus* oil" (also referred to as *ricinus* oil or castor oil) is understood in the present document to refer in particular to *ricinus* oil as described in CD Römpp Chemie Lexikon, Version 1.0, Thieme Verlag.

The term "ketone resin" in the present document is understood to mean, In particular, ketone resin as described in CD Römpp Chemie Lexikon, Version 1.0, Thieme Verlag.

The present polyol component K1 comprises at least one aliphatic triol A2, wherein the aliphatic triol A2 is:
1,2,3-propanetriol and/or
1,1,1-trimethylolpropane and/or
polyether polyols based on 1,1,1-trimethylolpropane with a molecular weight of 170-500 g/mol and an OH number of 400-1100 mg KOH/g.

If the aliphatic triol A2 is 1,2,3-propanetriol (also referred to as glycerol), then this is advantageous in that, as a result, higher tensile strengths are obtained in comparison to polyether polyols based on trimethylolpropane.

Suitable 1,2,3-propanetriols are commercially available from the company ecoMotion GmbH, Germany.

If the aliphatic triol A2 is 1,1,1-trimethylolpropane (also referred to as trimethylolpropane or 2-(hydroxymethyl)-2-ethylpropane-1,3-diol), then this is advantageous in that, as a result, higher tensile strengths and E moduli (in the elongation range 0.5-5%) are obtained compared to 1,2,3-propanetriol and compared to polyether polyols based on trimethylolpropane.

Suitable 1,1,1-trimethylolpropanes are also commercially available, for example, from the company Perstorp.

If the aliphatic triol A2 consists of polyether polyols based on 1,1,1-trimethylolpropane with a molecular weight of 170-500 g/mol, in particular 175-400 g/mol, preferably of 175-350 g/mol, and an OH number of 400-1100 mg KOH/g, in particular 500-1000 mg KOH/g, preferably 520-980 mg KOH/g, measured according to DIN 53 240, then this is advantageous in that, as a result, higher E moduli (in the elongation range 0.05-0.25%) in comparison to 1,2,3-propanetriol and 1,1,1-trimethyloipropane are always obtained with decreasing (A1/A2) ratio, in particular if the weight percent ratio (A1/A2) is 4-9.

The polyether polyols based on 1,1,1-trimethylolpropane are preferably alkoxylated 1,1,1-trimethylolpropane, in particular ethoxylated or propoxylated 1,1,1-trimethylolpropane, most preferably propoxylated 1,1,1-trimethylolpropane.

Suitable polyether polyols based on 1,1,1-trimethylolpropane are also available commercially, for example, under the trade name Desmophen® 4011 T from Bayer Material Science, Germany or under the trade name Lupranol® 3903 from BASF, Germany.

The present polyisocyanate component K2 comprises at least one aromatic polyisocyanate B1.

Suitable aromatic polyisocyanates B1 are, In particular, monomeric di-or triisocyanates, as well as oligomers, polymers and derivatives of monomeric di-or triisocyanates, as well as any mixtures thereof.

Suitable aromatic monomeric di-or triisocyanates are, in particular, 2,4-and 2,6-toluylene diisocyanate and any mixtures of these isomers (TDI), 4,4'-, 2,4'-and 2,2'-diphenylmethane diisocyanate and any mixtures of these isomers (MDI), 1,3-and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane and tris-(4-isocyanatophenyl)thiophosphate. Preferred aromatic monomeric di-or triisocyanates are derived from MDI and/or TDI.

Suitable oligomers, polymers and derivatives of the mentioned monomeric di-and triisocyanates are derived, in particular, from MDI and TDI. Among those, commercially available types, TDI oligomers such as Desmodur® IL (from Bayer), are particularly suitable; also suitable are forms of MDI that are liquid at room temperature (so-called "modified MDI"), which represent mixtures of MDI with MDI derivatives such as, in particular, MDI carbodiimides or MDI uretonimines, known under trade names such as Desmodur® CD, Desmodur® PF, Desmodur® PC (all from Bayer), as well as mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranat® M 10 R (from BASF). The above-mentioned oligomeric polyisocyanates in practice usually represent mixtures of substances with different oligomerization degrees and/or chemical structures. They preferably have a mean NCO functionality of 2.1 to 4.0.

As aromatic polyisocyanates B1, it is preferable to use MDI and/or TDI comprising ≥40% by weight of monomeric MDI and/or monomeric TDI, relative to the total weight of the MDI and/or TDI.

Furthermore, it is advantageous if the total of the NCO groups that do not originate from B1 is ≤5%, in particular ≤2%, particularly preferably ≤1%, most preferably ≤0.5%, relative to the total of all the NCO groups of the two-component polyurethane composition.

The weight percent ratio (A1/A2) is 4-50.

If the weight percent ratio (A1/A2) is <4, then this is disadvantageous in that, as a result, the elongations at break are so low that the resulting compositions are not suitable as adhesives or potting compounds.

If the weight percent ratio (A1/A2) is >50, then this is disadvantageous in that, as a result, the E modulus is so low that the resulting compositions are not suitable as adhesives or potting compounds.

If the weight percent ratio (A1/A2) is 35-4, in particular 20-4, particularly preferably 14-4, then this is advantageous in that, as a result, high tensile strengths are obtained.

If the weight percent ratio (A1/A2) is 50-20, in particular 50-35, then this is advantageous in that, as a result, high elongations at break are obtained.

If the weight percent ratio (A1/A2) is 35-4, in particular 14-4, then this is advantageous in that, as a result, high E moduli (in the elongation range 0.05-0.25%) are obtained.

If the aliphatic triol A2 is 1,1,1-trimethylolpropane and the weight percent ratio (A1/A2) is 35-4, in particular 20-4, particularly preferably 14-4, then this is advantageous in that, as a result, high tensile strengths are obtained.

For the same advantage of high tensile strengths, In the case of:
 1,2,3-propanetriol, a ratio in weight percent of (A1/A2) of 35-4 is advantageous,
 polyether polyols based on trimethylolpropane, a ratio in weight percent of (A1/A2) of 14-4, in particular 10-4, is advantageous.

If the aliphatic triol A2 is 1,1,1-trimethylolpropane and if the weight percent ratio (A1/A2) is 50-35, then this is advantageous in that, as a result, high elongations at break are obtained.

For the same advantage of high elongations at break, in the case of:
 1,2,3-propanetriol, a ratio in weight percent of (A1/A2) of 50-35 is advantageous,
 polyether polyols based on trimethylolpropane, a ratio in weight percent of (A1/A2) of 50-10, in particular 50-20, preferably 50-30, is advantageous.

If the aliphatic triol A2 is 1,1,1-trimethylolpropane and if the weight percent ratio (A1/A2) is 35-4, in particular 20-4, in particular preferably 14-4, then this is advantageous in that, as a result, high E moduli (in the elongation range 0.5-5%) are obtained.

For the same advantage of high E moduli, in the case of:
 1,2,3-propanetriol, a ratio in weight percent of (A1/A2) of 35-4, in particular 20-4, particularly preferably 14-4, is advantageous, If the aliphatic triol A2 is 1,1,1-trimethylolpropane and if the weight percent ratio (A1/A2) is 35-4, in particular 20-4, then this is advantageous in that, as a result, high E moduli (in the expansion range 0.5-0.25%) are obtained.

For the same advantage of high E moduli, in the case of:
 1,2,3-propanetriol, a ratio in weight percent of (A1/A2) of 35-4 is advantageous.
 polyether polyols based on trimethylolpropane, a ratio in weight percent of (A1/A2) of 35-4, in particular 20-4, preferably 15-4, particularly preferably 10-4, is advantageous.

The ratio of all the NCO groups of the aromatic polyisocyanates B1 to all the OH in the sum of (A1+A2) is 1.15:1-0.85:1. The ratio of all the NCO groups of the aromatic polyisocyanates B1 to all the OH in the sum of (A1+A2) is preferably 1.1:1-0.9:1. The above-described ratio is understood to mean the molar ratio of the groups mentioned.

In the two-component polyurethane composition, the total of all the OH groups of (A1+A2) is ≥90% of the total of all the OH groups of the two-component polyurethane composition.

Preferably, in the two-component polyurethane composition, the total of all the OH groups of (A1+A2) is ≥95%, in particular ≥98%, particularly preferably ≥99%, most preferably ≥99.5%, of the total of all the OH groups of the two-component polyurethane composition. This is conducive to high values for the tensile strength and the E modulus.

The two-component polyurethane composition is preferably substantially free of OH groups that do not originate from (A1+A2). In this case, the term "substantially free" is meant to mean that the total of the OH groups that do not originate from (A1+A2) is ≤5%, in particular ≤2%, particularly preferably ≤1%, most preferably ≤0.5%, relative to the total of all the OH groups of the two-component polyurethane composition. This is conducive to high values for the tensile strength and the E modulus.

The two-component polyurethane composition is preferably substantially free of OH groups of the following substances:
  polyether and/or polyester polyols.
  low molecular weight polyols with a molecular weight of 120 to 3000 g/mol (except for 1,2,3-propanediol), in particular;
  low molecular weight aliphatic triols with a molecular weight of 120 to 2000 g/mol (except for 1,2,3-propanetriol).

There are different types of such low molecular weight aliphatic triols. They can contain urethane and/or urea and/or ether groups, for example. The shape of the triols can be quite diverse. For example, star-shaped or comb-shaped triols are possible. Moreover, both primary and secondary hydroxyl groups can be present in the triol. For example, the mentioned low molecular weight aliphatic triols can be produced from an aliphatic triisocyanate, in particular from an isocyanurate, which is formed from three diisocyanate molecules, in an excess of aliphatic diols, in particular of polyether diols, optionally by an additional post-elongation by means of aliphatic diisocyanates and aliphatic diols. Additional examples of low molecular weight aliphatic triols can be obtained from low molecular weight aliphatic triols such as trimethylolpropane or glycerol, for example, and from an aliphatic diisocyanate, and subsequent reaction with an aliphatic diol. Other examples of low molecular weight aliphatic triols are products of an alkoxylation reaction of low molecular weight aliphatic triols such as trimethylolpropane or glycerol, for example.
  low molecular weight diols with a molecular weight of 120 to 2000 g/mol,
  low molecular weight polyols with 5 to 8 hydroxyl groups with a molecular weight of 120 to 3000 g/mol. Typically such polyols are sugar alcohols as well as polyols based on sugar alcohol, which comprise a corresponding number of OH groups, in particular pentitols or hexitols, or polyols based on disaccharides. It is also possible to use the corresponding sugars.

Preferably, the proportion of the total of A1 and A2 is ≥90% by weight, in particular ≥95% by weight, particularly ≥99% by weight, relative to the total weight of the polyol component K1.

Preferably, the proportion of the aromatic polyisocyanate B1 is ≥90% by weight, in particular ≥95% by weight, particularly preferably ≥99% by weight, relative to the total weight of the polyisocyanate component K2.

Components K1 and K2 are advantageously formulated in such a manner that the volume ratio of component K1 and component K2 is between 1:3 and 3:1, in particular between 1:2 and 2:1. This ratio is particularly preferably about 1:1.

The two components K1 and K2 can comprise other constituents in addition to the already mentioned constituents, which are known to the person skilled in the art from polyurethane chemistry. They can be present in only one component or in both components. As such additional constituents, it is possible to use, for example, solvents, plasticizers and/or extenders, fillers such as in particular carbon black, chalk, talc, barite, phyllo silicates, adhesive promoters such as, in particular, trialkoxysilanes, thixotropic agents such as amorphous silicic acid, drying agents such as zeolites and color pigments.

As the person skilled in the art of polyurethane adhesives knows, in the production of the components, in particular for the polyisocyanate component K2, one must ensure that their constituents are as free of water as possible and that the components are handled with exclusion of humidity.

Components K1 and K2 are stored separately from one another prior to use and are mixed with one another only at the time of or immediately before use. The components are advantageously present in a packaging which consists of two mutually separate chambers, and in particular in such a manner that the polyol component K1 is present in one chamber and the polyisocyanate component K2 in the other chamber. Components K1 and K2 can be filled into the chambers of the packaging and sealed off in an air-and moisture-tight manner.

In an additional aspect, the invention comprises a package consisting of a packaging with two mutually separate chambers and a two-component polyurethane composition.

Preferred packages of this type are, on the one hand, side-by-side dual cartridges or coaxial cartridges, in which two tubular chambers are arranged next to one another or in one another, and sealed off with pistons in an air-and moisture-tight manner.

For uses in larger amounts, in particular for uses in industrial manufacturing, the components K1 and K2 are advantageously filled and stored in drums or hobbocks. In this case, the components are dosed in by means of conveyance pumps, such as those usually used for two-component adhesives in industrial manufacturing, through the lines of a mixing apparatus.

In any package it is important that at least the polyisocyanate component K2 is sealed off in an air-and moisture-tight manner, so that the two components can be stored for a long time, i.e., typically for longer than 6 months.

The described two-component polyurethane composition is advantageously usable as an adhesive or matrix resin for a fiber composite (composite), potting compound, adhesive, cover, coating, paint, lacquer or seal.

In an additional aspect, the invention comprises a method for bonding.

The method for bonding comprises the following steps:
  mixing the above-described components K1 and K2,
  applying the mixed polyurethane composition to at least one of the substrate surfaces to be bonded together,
  joining within the open time,
  curing the polyurethane composition.

The mixing is typically carried out by means of static mixers or dynamic mixers.

The mixed polyurethane composition is applied to at least one of the substrate surfaces to be bonded together. The substrate to be bonded preferably comprises or consists of a material selected from the group consisting of metal, plastic, wood, glass, ceramic and fiber-reinforced plastics, in particular metal and fiber-reinforced plastics.

Typically two substrates are present, which are to be bonded together. It is possible that the joining partner, i.e., the second substrate, is identical to or different from the first substrate. The adhesive application can be made on the first and/or on the second joining partner. After the adhesive application, the joining partners are joined within the open time. After the joining, the curing of the polyurethane composition takes place.

Thus, a composite of the joining partners is formed, wherein the adhesive connects these joining partners together in a non-positive manner.

The result of the above-described process is a bonded article, which is in particular a bonded article comprising, as substrates, metal, plastic, wood, glass, ceramic and fiber-reinforced plastics, in particular metal and fiber-reinforced plastics. Such an article is an additional aspect of the invention.

The polyurethane composition is preferably used as a structural adhesive. In an additional aspect, the invention therefore comprises the use of a two-component polyurethane composition as an adhesive, In particular as a structural adhesive.

It is preferable for such a structural adhesive, in the cured state at room temperature, to have a tensile strength of ≥5 MPa, in particular of a ≥6 MPa. Preferably, in the cured state at room temperature, a structural adhesive has an elongation at break of ≥30%, in particular of ≥60%. Preferably, in the cured state at room temperature, a structural adhesive has an E modulus of ≥10 MPa. These mentioned mechanical values are measured as described in the examples that follow.

Typical examples for uses of the polyurethane compositions according to the invention are in car manufacture and light construction. Here, the cured adhesive is part of a bearing structure and thus forms an important joining element on whose mechanical properties stringent requirements are placed. The present invention fulfills these stringent requirements optimally.

In an additional aspect, the invention comprises a method for a non-positive filling in of joints and fissures in a substrate, comprising the steps:
a) mixing the above-described polyol component K1 and polyisocyanate component K2 as described above,
b) applying the mixed polyurethane composition in the joint to be bridged between two substrates or in the fissure to be filled in on the surface of a substrate,
c) curing the polyurethane composition in the joint or in the fissure.

The above-described method results in a filled-in article, in particular, in a bonded article, comprising as substrates, metal, plastic, wood, glass, ceramic and fiber-reinforced plastics, in particular metal and fiber-reinforced plastics. Such an article is an additional aspect of the invention. In an additional aspect, the invention comprises such a filled-in article.

The polyurethane composition is preferably used as a potting compound, in particular as an electro-potting compound. In an additional aspect, the invention therefore comprises the use of a two-component polyurethane composition as potting compound, in particular as an electro potting compound.

Such a potting compound, in the cured state at room temperature, preferably has a tensile strength of ≥10 MPa. Such a potting compound, in the cured state at room temperature, preferably has an elongation at break of ≥50%, in particular of ≥80%. Such a potting compound, in the cured state at room temperature, preferably has a (elongation range 0.05-0.25%) of ≥100 MPa. Here, these mentioned mechanical values are measured as described in the following examples.

Typical examples of uses of the polyurethane compositions according to the invention are found in the field of electro potting compositions.

EXAMPLES

The compositions 2-5 and 7-14 and 16-19 indicated in Table 1 as examples are examples according to the invention, whereas Examples 1, 6 and 15 are reference examples.

For producing component K1, component A1 and component A2-1, or A2-2, or A2-3, or A2-4 as well as 1% by weight (relative to the total weight of component K1) of a drying agent (PURMOL® molecular sieve, Zeochem AG, Switzerland) were weighed out gravimetrically in accordance with the ratio A1/A2 indicated in Table 2 and mixed in a SpeedMixer® (DAC 150 FV, Hauschild) for 30 seconds at 3000 rpm.

Subsequently, component K2 (B1) according to Table 2 was weighed out gravimetrically, added to component K1, and mixed in the SpeedMixer for 30 seconds at 3000 rpm. Components K1 and K2 were mixed in the weight ratio of K1:K2 such that in each case an NCO/OH ratio of 1.07 resulted. Subsequently, the mixed composition was poured for hardening into Teflon dishes with a diameter of 20 cm, and from them samples were obtained with a thickness of 2 mm.

In Table 2, the raw materials used (and indicated in Table 1) are marked with an "X"; they were mixed as described above in regard to Examples 1-9. Thus, for example, for producing Example 2, 65.26 g Desmophen 1150, 1.36 g 1,2,3-propanetriol and 0.68 g Purmol molecular sieve powder were mixed with one another (3 min Speedmixer at 3000 rpm), and allowed to cure after mixing with 33.71 g MDI (Desmodur VKS 20 including 1% by weight of a 1% solution of a catalyst based on bismuth and zinc neodecanoate) (1 min Speedmixer at 3000 rpm).

Measurements

The mixed components K1 and K2 were made into dumbbell-shaped specimens according to ISO 527, Part 2, 1B and cured for 24 h at 25° C. and then for 3 h at 80° C.

After a conditioning time of 24 h at 25° C., the E modulus 1 (elongation range 0.5-5%), the E modulus 2 (elongation range 0.05-0.25%), the tensile strength (ZF) and the elongation at break (BD) of the test specimens thus prepared according to ISO 527 were measured on a Zwick Z020 tensile testing machine at a test temperature of 23=C and a test speed of 200 mm/min. The results are found in Table 3.

TABLE 1 raw materials used, *organometallic catalyst based on bismuth and neodecanoate, 1% solution.

| | |
|---|---|
| A1 | Reaction product of ricinus oil with ketone resins, Desmophen ® 1150, Bayer Material Science, Germany |
| A2-1 | 1,2,3-Propanetriol, ecoMotion GmbH, Germany, OH number of 1880 |
| A2-2 | 1,1,1-Trimethylolpropane (also referred to as trimethylolpropane or 2-(hydroxymethyl)-2-ethylpropane-1,3-dione), Perstorp |
| A2-3 | Desmophen ® 4011 T, OH number of 550 ± 25 mg KOH/g, molecular weight of approximately 300 ± 20 g/mol, Bayer Material Science, Germany |
| A2-4 | Lupranol ® 3903, OH number of 935 mg KOH/g, molecular weight of approximately 180 ± 10 g/mol, BASF, Germany |
| B1 | MDI (45% monomeric MDI), 4,4'-, 2,4'-diphenylmethane diisocyanate, Desmodur ® VKS 20, Bayer Material Science, (comprising 1% by weight of catalyst*) |

TABLE 2

| | compositions | | | | | |
|---|---|---|---|---|---|---|
| Example | A1/A2 | A1 | A2-1 | A2-2 | A2-3 | A2-4 | B1 |
| 1 | — | X | | | | | X |
| 2 | 48.5 | X | X | | | | X |
| 3 | 23.75 | X | X | | | | X |
| 4 | 15.5 | X | X | | | | X |

TABLE 2-continued compositions

| Example | A1/A2 | A1 | A2-1 | A2-2 | A2-3 | A2-4 | B1 |
|---|---|---|---|---|---|---|---|
| 5 | 11.38 | X | X | | | | X |
| 6 | — | X | | | | | X |
| 7 | 48.5 | X | | X | | | X |
| 8 | 23.75 | X | | X | | | X |
| 9 | 15.5 | X | | X | | | X |
| 10 | 11.38 | X | | X | | | X |
| 11 | 21 | X | | | X | | X |
| 12 | 10 | X | | | X | | X |
| 13 | 6.6 | X | | | X | | X |
| 14 | 4.8 | X | | | X | | X |
| 15 | 98 | X | | | | X | X |
| 16 | 32 | X | | | | X | X |
| 17 | 18.8 | X | | | | X | X |
| 18 | 11.4 | X | | | | X | X |
| 19 | 8.4 | X | | | | X | X |

TABLE 3 measurement of mechanical properties

| Example | ZF [MPa] | BD [%] | E modulus 1 [MPa] | E modulus 2 [MPa] |
|---|---|---|---|---|
| 1 | 17 | 95 | 116 | 182 |
| 2 | 22 | 47 | 398 | 700 |
| 3 | 33 | 12 | 642 | 679 |
| 4 | 31 | 5 | 662 | 684 |
| 5 | 36 | 5 | 717 | 693 |
| 6 | 16 | 98 | 81 | 135 |
| 7 | 19 | 60 | 310 | 404 |
| 8 | 31 | 15 | 595 | 538 |
| 9 | 35 | 6 | 717 | 610 |
| 10 | 39 | 5 | 800 | 594 |
| 11 | 15 | 54 | 210 | 255 |
| 12 | 19 | 68 | — | 588 |
| 13 | 23 | 34 | — | 976 |
| 14 | 27 | 15 | — | 1082 |
| 15 | 16 | 80 | 169 | 166 |
| 16 | 19 | 69 | 314 | 342 |
| 17 | 22 | 34 | — | 972 |
| 18 | 27 | 28 | — | 1082 |
| 19 | 32 | 11 | — | 1303 |

The invention claimed is:

1. A two-component polyurethane composition consisting of a polyol component K1, a polyisocyanate component K2, and one or more member selected from the group consisting of fillers and drying agents; wherein
the polyol component K1 is
at least one reaction product of *ricinus* oil with ketone resins with an OH number of 110 to 200 mg KOH/g A1, and
at least one aliphatic triol A2;
the polyisocyanate component K2 is at least one aromatic polyisocyanate B1;
the weight percent ratio (A1/A2) is 20-50;
the ratio of all the NCO groups of the aromatic polyisocyanates B1 to all the OH groups in the sum of (A1+A2) =1.15:1-0.85:1;
the aliphatic triol A2 is
1,2,3-propanetriol and/or
1,1,1-trimethylolpropane and/or
polyether polyols based on 1,1,1-trimethylolpropane with a molecular weight of 170-500 g/mol and an OH number of 400-1100 mg KOH/g; and
the total of all the OH groups of (A1+A2) is ≥99.5% of the total of all the OH groups of the two-component polyurethane composition.

2. Two-component polyurethane composition according to claim 1, wherein the aliphatic triol A2 is 1,2,3-propanetriol.

3. Two-component polyurethane composition according to claim 1, wherein the aliphatic triol A2 is 1,1,1-trimethylolpropane.

4. Two-component polyurethane composition according to claim 1, wherein the aliphatic triol A2 consists of polyether polyols based on 1,1,1-trimethylolpropane with a molecular weight of 170-500 g/mol and an OH number of 400-1100 mg KOH/g.

5. Two-component polyurethane composition according to claim 1, wherein the weight percent ratio (A1/A2) is 35-50.

6. Two-component polyurethane composition according to claim 1, wherein the aromatic polyisocyanate B1 consists of
MDI, comprising ≥40% by weight of monomeric MDI; and/or
TDI, comprising ≥40% by weight of monomeric TDI, relative to the total weight of the MDI and/or TDI.

7. Two-component polyurethane composition according to claim 1, wherein in the two-component polyurethane composition, the total of the OH groups that do not originate from (A1+A2) is ≤5%, relative to the total of all the OH groups of the two-component polyurethane composition.

8. Two-component polyurethane composition according to claim 1, wherein in the two-component polyurethane composition, the total of the NCO groups that do not originate from B1 is ≤5%, relative to the total of all the NCO groups of the two-component polyurethane composition.

9. Two-component polyurethane composition according to claim 1, wherein the proportion of the total of A1 and A2 is ≥90% by weight, relative to the total weight of the polyol component K1.

10. Two-component polyurethane composition according to claim 1, wherein the proportion of the aromatic polyisocyanate B1 is ≥90% by weight, relative to the total weight of the polyisocyanate component K2.

11. Method for bonding, comprising the steps of
mixing the polyol component (K1 and the polyisocyanate component (K2) of a two-component polyurethane composition according to claim 1,
applying the mixed polyurethane composition to at least one of the substrate surfaces to be bonded together,
joining within the open time,
curing the polyurethane composition.

12. Method for a non-positive filling in of joints and fissures in a substrate, comprising the steps of:
a) mixing the polyol component (K1) and the polyisocyanate component (K2) of a two-component polyurethane composition according to claim 1,
b) applying the mixed polyurethane composition in the joint to be bridged between two substrates or in the fissure to be filled in on the surface of a substrate,
c) curing the polyurethane composition in the joint or in the fissure.

13. A bonded article comprising two substrates bonded together, wherein the bonded article is made by the method according to claim 11.

14. A composition-filled article, the composition-filled article comprising either
two substrates that are bridged by a joint, or
a substrate having a surface, the surface having a fissure that has been filled; wherein composition-filled article is made by the method according to claim 12.

15. Two-component polyurethane composition according to claim 1, wherein the polyether polyols based on 1,1,1-trimethylolpropane are selected from the group consisting of alkoxylated 1,1,1-trimethylolpropane, ethoxylated 1,1,1-trimethylolpropane, and propoxylated 1,1,1-trimethylolpropane.

16. Two-component polyurethane composition according to claim 1, wherein the polyether polyols based on 1,1,1-trimethylolpropane are selected from the group consisting of ethoxylated 1,1,1-trimethylolpropane and propoxylated 1,1,1-trimethylolpropane.

17. Two-component polyurethane composition according to claim 1, wherein the polyether polyols based on 1,1,1-trimethylolpropane comprise propoxylated 1,1,1-trimethylolpropane.

18. A two-component polyurethane composition consisting of a polyol component K1, a polyisocyanate component K2, and one or more member selected from the group consisting of fillers and drying agents; wherein the polyol component K1 is
   at least one reaction product of *ricinus* oil with ketone resins
   with an OH number of 110 to 200 mg KOH/g A1, and
   at least one aliphatic triol A2, the aliphatic triol A2 being a polyether polyol based on 1,1,1-trimethylolpropane with a molecular weight of 170-500 g/mol and an OH number of 400-1100 mg KOH/g;

the polyisocyanate component K2 is at least one aromatic polyisocyanate B1;

the weight percent ratio (A1/A2) is 10-50;

the ratio of all the NCO groups of the aromatic polyisocyanates B1 to all the OH groups in the sum of (A1+A2) =1.15:1-0.85:1; and the total of all the OH groups of (A1+A2) is ≥90% of the total of all the OH groups of the two-component polyurethane composition.

* * * * *